Jan. 23, 1934.    W. E. HANN    1,944,233

VIBRATION DAMPER

Filed June 27, 1929

INVENTOR
WILLIAM E. HANN.
BY
ATTORNEY

Patented Jan. 23, 1934

1,944,233

UNITED STATES PATENT OFFICE 1,944,233

VIBRATION DAMPER

William E. Hann, Detroit, Mich., assignor to Chrysler Corporation, Detroit, Mich., a corporation of Delaware Application June 27, 1929. Serial No. 374,023

12 Claims. (Cl. 74—6)

This invention relates to torsional vibration damper for internal combustion engines.

The main objects of this invention are to provide an improved vibration damper of the type wherein the inertia ring is journaled on the hub member, so that the interposed rubber securing sleeve will not be subjected to radial thrust; to provide an improved damper of this character in which the inertia ring will be positively held in concentric relation with respect to the hub member; and to provide a generally improved construction, which will give satisfactory and efficient service and not be subject to wobbling by reason of the inertia ring becoming eccentric with respect to the supporting hub.

An illustrative embodiment of this invention is shown in the accompanying drawing, in which.

Figure 1:
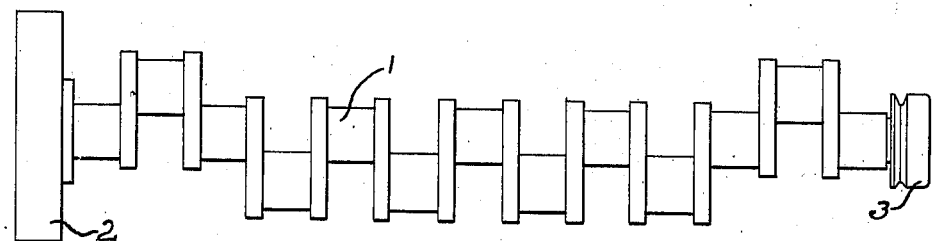
Fig. 1 is a view of a multi-throw crankshaft, provided at one end thereof with my improved vibration damper.

Heretofore, in the manufacture of vibration dampers of this general character, the inertia rings have been supported solely upon the rubber sleeve which bonds the inertia ring to the inner member or hub. By having the interposed rubber sleeve act and function as the sole support for the outer inertia ring, there has been a tendency for the inertia ring to become eccentric with respect to the hub, due to the fact that the rubber may vary in its general consistency.

In the present invention, the inertia ring is provided with a bearing surface so as to be journaled in concentric relation on the hub and with respect to the center of the crankshaft. Furthermore, by having the inertia ring journaled with a metal to metal contact on the supporting hub, the fan belt, which ordinarily is driven from a groove provided in the inertia ring, will not have a tendency to pull the inertia ring off center, thereby causing it to wobble.

In the construction shown in the drawing, a crankshaft (1) of multi-throw type is shown provided at one end thereof with a flywheel (2) rigidly keyed thereon in the usual and customary manner. At the other end of the crankshaft, the improved vibration damper (3) is shown mounted thereon.

Figure 3:
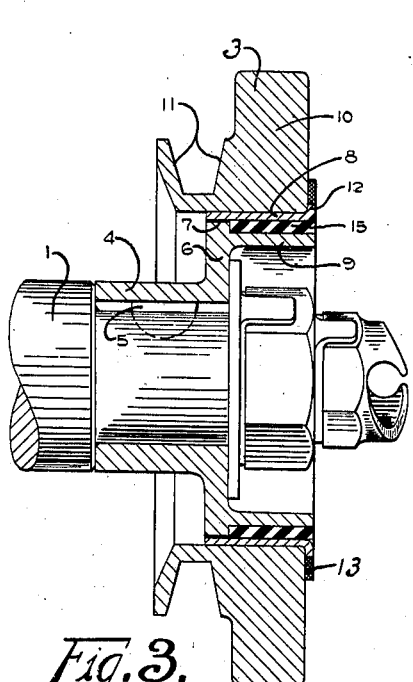
Fig. 3 is a sectional view of the same, taken on the line 3—3 of Fig. 2, as it appears when mounted on the front end of a crankshaft.
Figure 2:
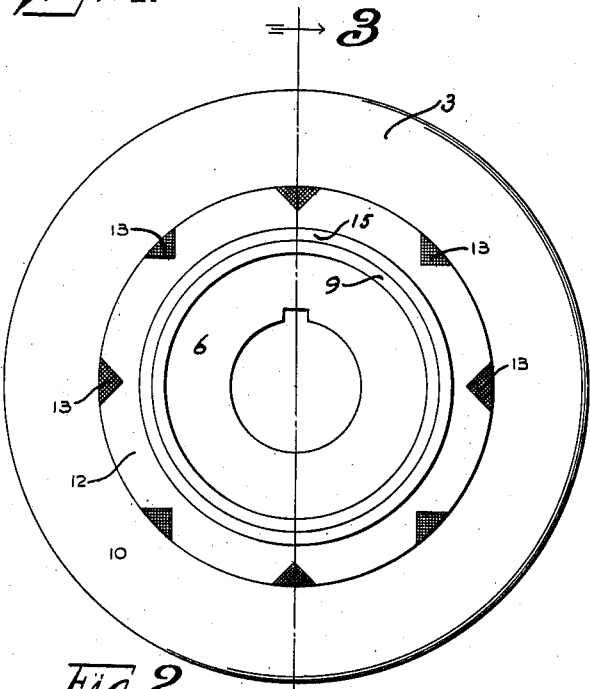
Fig. 2 is an enlarged face view of the vibration damper, unmounted.

The improved vibration damper as illustrated in Figs. 2 and 3 of the drawing comprises an inner hub member (4), secured by a key (5), so as to be non-rotatable with respect to the crankshaft (1). The forward end of the hub member (4) is provided with a radially extending flange (6), the outer periphery of which provides an annular bearing surface (7), upon which is journaled a metal sleeve member (8). The flange (6), inward from the sleeve (8) and in spaced safe relation thereto, is provided with an axially extending flange (9), integrally formed thereon.

The space between the flange (9) and the sleeve (8) is filled with a yieldable material 15, such as rubber, vulcanized to the adjacent surfaces and faces of the flange and sleeve, so that surface adhesion of the rubber to the opposed metal faces of the members will yieldingly connect the two together and permit limited relative rotation therebetween.

An inertia ring (10) provided with a fan belt pulley groove (11) is mounted and supported upon the sleeve (8). At the forward end of the sleeve (8), a radially extending flange (12) is provided, which abuts against the front face of the inertia ring (10) and which may be secured thereto by any suitable means, such as spot welding, as shown at 13.

Figure 4:
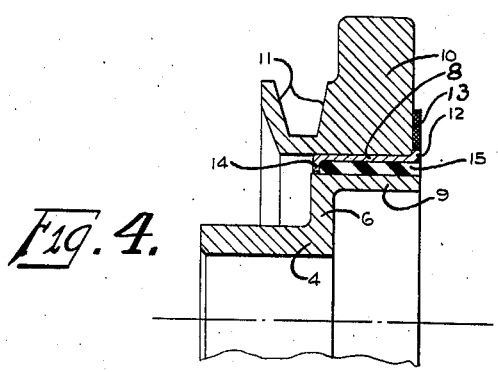
Fig. 4 is an enlarged sectional view of a modified form, showing a slightly different construction for journalling the inertia ring on the hub.

In the modification shown in Fig. 4 of the drawing, the sleeve (8) is provided, at the end opposite the flange (12) with an inturned flange (14), which provides a metal to metal bearing contact with the outer periphery of the flange (6).

In the operation of this device, the inertia ring (10), being journaled with a metal to metal contact on the inner member or hub (4), will always be maintained in concentric relation with respect to the hub member and crankshaft upon which it is mounted.

Tightening of the fan belt, which is driven by the groove in the inertia ring, will not have any tendency to cause the inertia ring to wobble, as has heretofore been the case.

The function of the rubber sleeve, which is vulcanized between the flange (9) and the outer sleeve (8) is to permit relative rotation between the inertia ring and hub, to a limited extent, but the rubber will not be subjected to radial thrust, due to the metal to metal journal bearing between the inner and outer members.

As to the functioning of this device in decreasing the amplitude of the torsional vibrations to a point where they will not be objectionable, the action of the inertia ring is to damp the vibration by counteracting forces, as distinguished from those devices wherein the same result is accomplished by the use of mechanism which absorbs energy by friction.

Although but one specific embodiment of this invention, and one modification thereof, have been herein shown and described, it will be understood that numerous details of the construction shown may be altered or omitted without departing from the spirit of this invention, as defined by the following claims.

What I claim is:

1. In a vibration damper of the class described, a rotatable member, a sleeve concentrically journaled on said member, a rubber member secured to said sleeve and member for limiting relative rotation therebetween, and an inertia member secured to said sleeve having a fan belt groove located in close proximity to the journaled portion thereof.

2. In a vibration damper of the class described, a rotatable member, a sleeve member concentrically journaled on said rotatable member, a rubber member secured to one of said members and vulcanized to the other of said members for limiting relative rotation therebetween, and an inertia member secured to said sleeve member having a fan belt groove therein, at least a portion of said groove being located in radial alignment with the journaled part of said sleeve.

3. In a vibration damper of the class described, a rotatable member, a sleeve member concentrically journaled on said rotatable member, a rubber member vulcanized to said members for limiting relative rotation therebetween, and an inertia member secured to said sleeve member and having a fan belt groove therein.

4. In a vibration damper, an inner member adapted to be secured to a crank shaft including a peripheral portion and an adjacent peripheral flange having a bearing surface, a sleeve journaled on the bearing surface of said flange and spaced from said adjacent peripheral portion, yieldable material in the space between said peripheral portion and said sleeve, and an inertia ring secured to said sleeve.

5. In a vibration damper, a hub including a protruding peripheral flange and having an adjacent inwardly located peripheral portion, a sleeve journaled on said flange and spaced from said inwardly located peripheral portion, a rubber connecting member located in the space between said peripheral portion and said sleeve and vulcanized to the adjacent surfaces thereof, and an inertia member secured to said sleeve.

6. In combination with a crankshaft for internal combustion engines, a vibration damper including a part fixed on said crankshaft and provided with a portion having a broad peripheral face and a substantially concentric peripheral bearing portion, means journaled on said bearing portion for damping the vibrations of said shaft including an inertia member and having a broad face positioned directly opposite to and overlapping said face of said part, and a relatively thin sheet of rubber interposed between said faces and being vulcanized thereto.

7. In combination with a crankshaft for internal combustion engines, a vibration damper including a part fixed on said crankshaft and provided with a portion having a broad peripheral face, means journaled on a portion of said peripheral face for damping vibrations of said shaft including an inertia member and having a portion thereof provided with a broad peripheral face positioned directly opposite to and overlapping said face of said part, and a relatively thin sheet of rubber interposed between said faces and surface bonded thereto.

8. In combination with a crankshaft for internal combustion engines, a vibration damper including a part fixed on said crankshaft having a peripheral bearing portion and a concentric broad peripheral face, means journaled on said bearing portion for damping vibrations of said shaft including an inertia member and having a broad face positioned directly opposite to and overlapping said broad peripheral face of said fixed part, the loci of substantially all portions of the broad face of said fixed part being spaced from the loci of substantially all portions of the face of said means, and a relatively thin sheet of rubber interposed between said faces and surface bonded thereto.

9. In combination with a crankshaft for internal combustion engines, a vibration damper including a part fixed on said crankshaft having a peripheral bearing portion and provided with a portion having a substantially regular broad peripheral face substantially concentric with said bearing portion, means journaled on said bearing portion for damping vibrations of said shaft including an inertia member and having a substantially regular broad peripheral face substantially uniformly spaced from said broad peripheral face of said inertia part overlapping the latter and directly opposite thereto, the loci of substantially all portions of the broad face of said fixed part being spaced from the loci of substantially all portions of the face of said means, and a relatively thin sheet of rubber under tension between said faces and surface bonded thereto.

10. In a vibration damper of the class described, a rotatable member, a sleeve concentrically journaled on said member, a rubber member secured to said sleeve and member for limiting relative rotation therebetween, and an inertia member secured to said sleeve.

11. In a vibration damper of the class described, a rotatable member, a sleeve member concentrically journaled on said rotatable member, a rubber member secured to one of said members and vulcanized to the other of said members for limiting relative rotation therebetween, and an inertia member secured to said sleeve member.

12. In a vibration damper of the class described, a rotatable member, a sleeve member concentrically journaled on said rotatable member, a rubber member vulcanized to said members for limiting relative rotation therebetween, and an inertia member secured to said sleeve member.

WILLIAM E. HANN.